United States Patent [19]

Bolieau

[11] Patent Number: 5,647,607
[45] Date of Patent: Jul. 15, 1997

[54] TETHER ATTACHMENT APPARATUS FOR AIR BAG COVER

[75] Inventor: Donald J. Bolieau, Ogden, Utah

[73] Assignee: Morton International, Inc., Chicago, Ill.

[21] Appl. No.: 559,981

[22] Filed: Nov. 17, 1995

[51] Int. Cl.$^6$ .................................................. B60R 21/20
[52] U.S. Cl. ............................... 280/728.2; 280/728.3
[58] Field of Search ........................... 280/728.3, 728.2, 280/732, 731, 728.1

[56] References Cited

U.S. PATENT DOCUMENTS

| | | | |
|---|---|---|---|
| 3,822,894 | 7/1974 | Muller et al. | 280/731 |
| 3,944,250 | 3/1976 | Wulf et al. | 280/732 |
| 4,893,833 | 1/1990 | DiSalvo et al. | 280/732 |
| 4,911,471 | 3/1990 | Hirabayashi | 280/732 |
| 4,964,653 | 10/1990 | Parker | 280/732 |
| 5,064,217 | 11/1991 | Shiraki | 280/728.3 |
| 5,096,221 | 3/1992 | Combs et al. | 280/728.3 |
| 5,150,919 | 9/1992 | Sakakida et al. | 280/732 |
| 5,184,843 | 2/1993 | Berger et al. | 280/728.2 |
| 5,195,776 | 3/1993 | Sakakida et al. | 280/732 |
| 5,242,191 | 9/1993 | Faigle et al. | 280/728.1 |
| 5,308,110 | 5/1994 | Kokeguchi | 280/732 |
| 5,316,333 | 5/1994 | Kokeguchi | 280/728.3 |
| 5,330,223 | 7/1994 | Hiramitsu et al. | 280/728.3 |
| 5,350,190 | 9/1994 | Szigethy | 280/731 |
| 5,398,960 | 3/1995 | Ravenberg et al. | 280/728.3 |

FOREIGN PATENT DOCUMENTS

0415362A2  3/1991  European Pat. Off. .

OTHER PUBLICATIONS

Attachment Of Air Bag Deployment Door To Air Bag Module Assembly. Research Disclosure No. 37004, p. 49. Disclosed Anonymously. Feb. 1995.

Primary Examiner—Brian L. Johnson
Assistant Examiner—Peter C. English
Attorney, Agent, or Firm—Philip C. Peterson; Steven C. Benjamin; Gerald K. White

[57] ABSTRACT

An element fixedly mounted in a motor vehicle having a free end and an aperture spaced apart therefrom is provided for securing an inner end portion of a flexible tether to the vehicle for restraining an air bag cover during air bag deployment. An attachment connector having a hook at one end is adapted to be engaged in hooked relation over the free end of the fixed element with the inner end portion of the tether sandwiched between facing adjacent surfaces of the attachment connector and the fixed element. A unidirectional, self-locking, snap-in-type, fastener mounted on the attachment connector remote from the hook end has a shank that is passed through the tether and is thereafter positioned to extend through the aperture of the fixed element when the attachment connector is engaged with the fixed element and pivoted about the hook end with the tether in sandwiched relation between the fixed element and the attachment connector. After the hook end is in place, the attachment connector is moved toward the fixed element until the fastener passes through the aperture and snaps into place for positively locking the tether, fixed element and attachment connector positively together without requiring the use of tools or other implements.

20 Claims, 2 Drawing Sheets

TETHER ATTACHMENT APPARATUS FOR AIR BAG COVER

BACKGROUND OF THE INVENTION

1. Field of the Invention

The present invention relates to a new and improved tether attachment apparatus for an air bag cover and more particularly to a tether attachment apparatus which is easily secured in place for receivably interconnecting an air bag cover tether to an air bag module or a bracket secured to a panel in a motor vehicle. The new and improved tether attachment apparatus eliminates the need for nuts, bolts, rivets, screws, etc., and utilizes a "snap-in-place" fastener that requires minimal effort to secure in place. Moreover, the tether attachment apparatus of the present invention eliminates point loading along the length of the tether resulting in improved reliability and a reduction in the chances of stress failure of the tether and/or associated components during air bag deployment.

2. Background of the Prior Art

Tethered cover attachment systems for air bags are disclosed in U.S. Pat. Nos. 5,332,257 and 5,398,960. In the latter patent, generally T-shaped anchors with a transverse pin at the end are secured to the inner end of web type tethers and the pins of the anchors are then inserted into channels provided on a module housing, with the insertion taking place transversely of the tether. In the former patent, inner ends of web type tethers are looped around a rod which is inserted into a channel on a side wall of an air bag module, again the insertion taking place in a direction transversely of the tether.

In U.S. patent applications Ser. No. 08/286,279, filed Aug. 5, 1994, now U.S. Pat. No. 5,460,401 and Ser. No. 08/286,795, filed Aug. 5, 1994, now pending, tether anchors similar to those of U.S. Pat. No. 5,398,960 are disclosed.

Tether anchor systems wherein the insertion of a pin or rod into an elongated slot or channel on an air bag module housing in a direction transversely of the tether webbing is required are sometimes troublesome to install, especially in cramped environments behind instrument panels, etc. and sometimes longer tethers are required resulting in a lesser amount of restraint on a rapidly opening cover.

U.S. Pat. No. 3,822,894 to Muller et al. discloses a steering wheel having a built-in air cushion employing a strong hinge between a cover and a dish containing the airbag so that on inflation, the cover is pushed away but not completely liberated from attachment to the steering wheel because of a tether riveted to a base member.

The Wulf et al., U.S. Pat. No. 3,944,250, discloses an automatically inflatable gas cushion for the protection of passengers in vehicles employing a cover which is opened upon inflation of the airbag or gas cushion and which is retained by a flexible band that is screw attached to a base so that the cover is restrained after opening.

The DiSalvo et al., U.S. Pat. No. 4,893,833, discloses a closure for an airbag deployment opening wherein an integral aluminum hinge flange on the closure is bolted to the frame of the vehicle permitting pivotal opening movement of the closure.

The Hirabayashi, U.S. Pat. No. 4,911,471, discloses an arrangement of an airbag device in a motor vehicle wherein angular pivotal movement of a door over the airbag is restricted by a strap to limit the angular degree of opening when the airbag is inflated.

U.S. Pat. No. 4,964,653 to Parker discloses a self-skinned foam closure element for an inflatable restraint door assembly having a combination hinge and tether for restraining travel of the closure element during airbag deployment.

U.S. Pat. No. 5,064,217 to Shiraki discloses a cover for an airbag unit having "Nylon" yarn bands molded in place and wrapped around a retaining band of resin provided on the airbag enclosure or housing.

The Sakakida et al. U.S. Pat. No. 5,195,776, discloses an air bag assembly wherein a plastic strap is deformed when a cover is opened and the deformed strap functions as a tether for the cover.

U.S. Pat. No. 5,242,191, to Faigle et al. discloses a tethered airbag cover system wherein the cover is retained after opening attached to the airbag itself.

European Patent Application No. EPO 0415 362 A2 and Sakakida et al. U.S. Pat. No. 5,150,919, disclose an airbag supporting system having two fly-away covers restrained by loose flexible straps.

OBJECTS OF THE INVENTION

Accordingly, it is an object of the present invention to provide a new and improved cover tether attachment apparatus for an airbag system in motor vehicles and the like and more particularly, to provide cover tether attachment apparatus which is easily installed and interconnected to the vehicle or air bag module by hand.

It is another object of the present invention to provide a new and improved cover tether attachment apparatus of the character described which requires no bolts, nuts, rivets, screws and the like, for connecting a tether to a vehicle or air bag module.

Yet another object of the present invention is to provide a new and improved cover tether attachment apparatus with load spreading arrangement for attaching the tether so that point loading along the length of the tether is eliminated.

Another object of the present invention is to provide a new and improved cover tether attachment apparatus employing a snap-in-place fastener for easy and rapid installation without tools.

BRIEF SUMMARY OF THE PRESENT INVENTION

The foregoing objects and advantages of the present invention are accomplished in a new and improved apparatus for positively connecting an end portion of an air bag door tether formed of flexible material to a motor vehicle. The motor vehicle is provided with a fixed element or bracket formed with a free outer end and a fastener receiving aperture spaced apart from the free end. An attachment bracket or connector having a hook portion at one end is adapted to be hooked over the free end of the fixed element and the end portion of the tether is sandwiched between facing surfaces of the attachment bracket and the fixed element. A unidirectional, snap-in-type fastener is mounted on the attachment bracket remote from the hook end portion and has a shank provided with a compressible holding skirt adapted to be compressed when passed through the aperture from one side of the fixed element and expandable after passage to engage an opposite side of the fixed element for retaining the attachment bracket in a positively secured, locked position hooked over the free end of the fixed element with a portion of the tether sandwiched between facing surfaces of the bracket and the fixed element. The tether is provided with an aperture to receive the fastener when the tether is placed on one side of the attachment bracket. The tether is then folded over the hook end portion of the attachment bracket and down an opposite side. The hook end portion with the tether thereon is then engaged over the free end of the fixed element and the attachment bracket is pivoted toward the fixed element about the hook end portion until the fastener snaps into place and locks after passage through the aperture of the fixed element.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
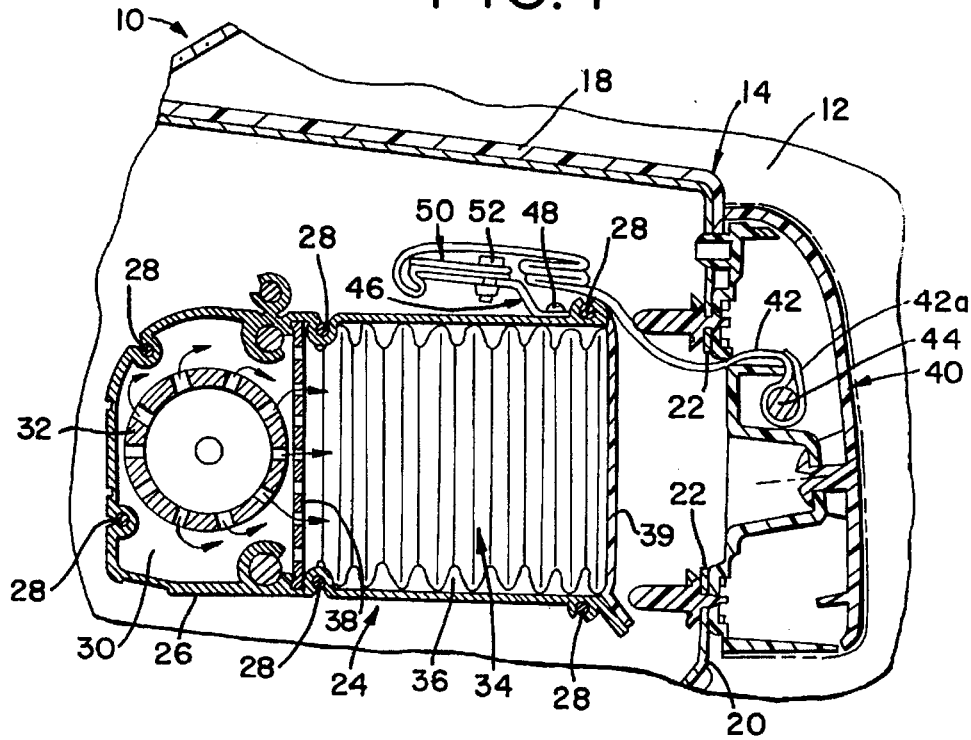
FIG. 1 is an elevational, longitudinal, cross-sectional view of an air bag inflation module mounted in a motor vehicle having a cover secured by a tether attachment system in accordance with the present invention and shown with the cover in a closed position before inflative deployment of the air bag.
Figure 2:
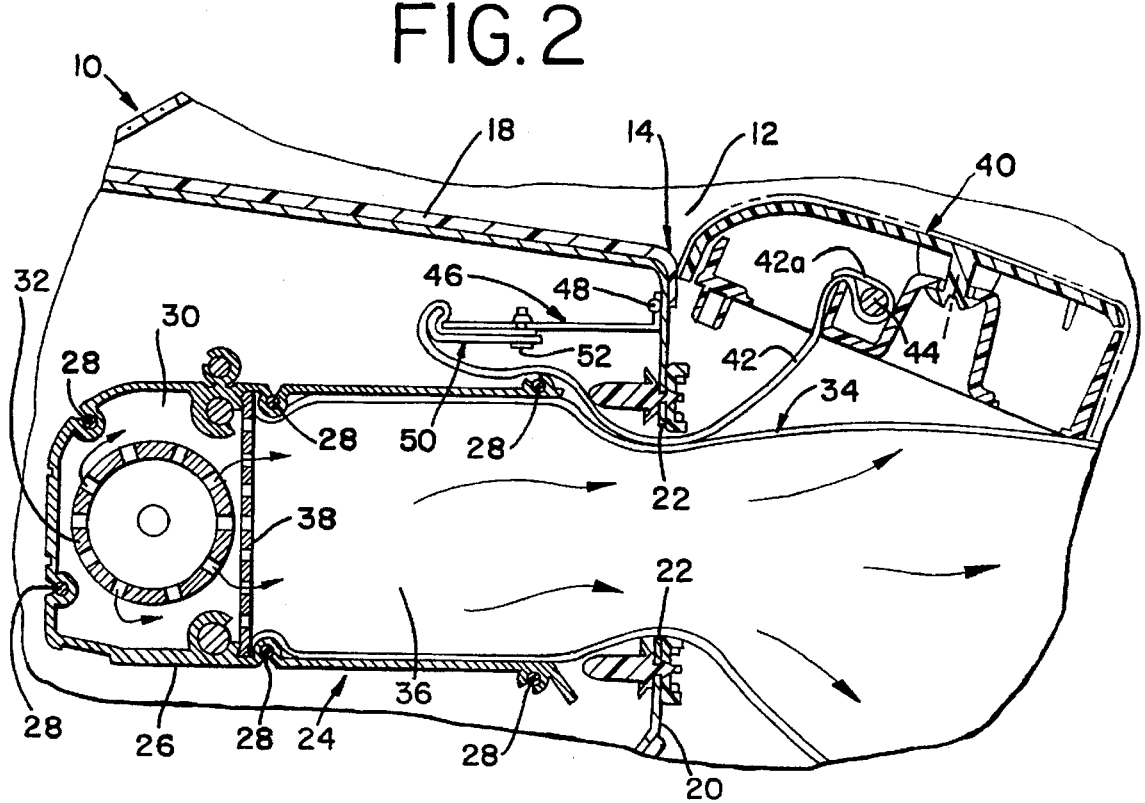
FIG. 2 is a longitudinal cross-sectional view similar to FIG. 1 but illustrating the cover in an open position restrained by the tether after air bag inflative deployment has occurred.

Referring now more particularly to the drawings, in FIGS. 1 and 2 there is illustrated a portion of a motor vehicle 10 having a passenger or occupant compartment 12 with an instrument panel or dashboard 14 at a forward end. The instrument panel or dashboard includes an upper, generally horizontal panel portion 18 and a rearwardly facing, downwardly extending dashboard panel 20 having a relatively large slot or cut out opening 22 facing toward the rear of the vehicle 10 and directly in front of an occupant or passenger (not shown) in the passenger compartment 12.

Below the panel portion 18 and forwardly of the panel opening or slot 22, the motor vehicle 10 is provided with an air bag inflator module 24 which includes a strong, lightweight housing 26 mounted in a fixed position in the vehicle by means of brackets, etc. (not shown) and fasteners 28. The housing 26 includes a forward compartment 30 containing an air bag inflator 32 which generates or supplies inflation gas for an air bag 34 which is contained in a folded up condition (FIG. 1) in a rearward compartment 36. The forward compartment 30 and the rearward compartment 36 are separated by a perforated or pervious diffuser panel 38 which diffuses and distributes inflation gas passing through openings therein from the inflator 32 to rapidly inflate the folded up air bag 34 (FIG. 1) causing the inflating air bag to move out of the rearwardly facing open end of the rearward compartment 36 which is directly aligned with the panel opening 22 as shown in FIG. 2. Normally the open, rearwardly facing end of the module housing 26 is sealed by a sheet of thin flexible material 39 (FIG. 1) to protect the air bag 34 and the inflator 32 against contamination from outside until the air bag is actually deployed by rapid gas inflation.

Referring to FIGS. 1 and 2, normally the opening 22 in the panel 20 is closed by a cover 40 which has an outer face forming a segment of the dashboard panel of the motor vehicle 10. The cover 40 is opened by pressure from the inflating air bag 34 (FIG. 2) and one or more flexible webs or tethers 42 are provided to limit and restrain the movement of the cover away from the panel 20 during air bag deployment so that injury or damage from the cover itself does not occur. Each tether 42 preferably takes the form of a woven textile webbing material similar to a seat belt or web belt that is strong and yet flexible. Moreover, the tether 42 preferably has a substantial width (1" to 2") and a substantial thickness so that the amount of stress developed therein during an air bag deployment is reduced, yet continued flexibility is provided.

An outer end portion 42a of each tether 42 is looped around an elongated bar or anchor rod 44 mounted on the cover 40 behind the outer face. Suitable tether and cover mounting and connection arrangements are shown and described in copending U.S. patent application Ser. No. 08/286,279, filed Aug. 5, 1994, and Ser. No. 08/286,795, filed Aug. 5, 1994, both of which applications are hereby incorporated herein by reference.

Figure 3:
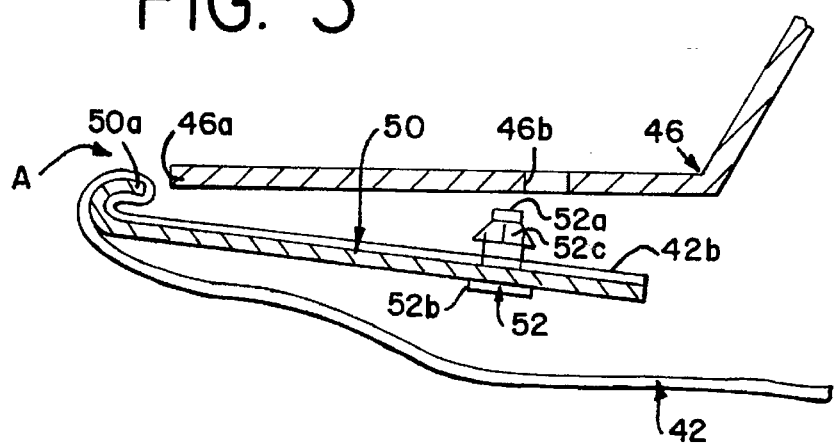
FIG. 3 is an enlarged side elevational view of a cover tether attachment system in accordance with the present invention shown in a condition wherein an inner end portion of the tether has been attached to an attachment bracket of the system.
Figure 4:
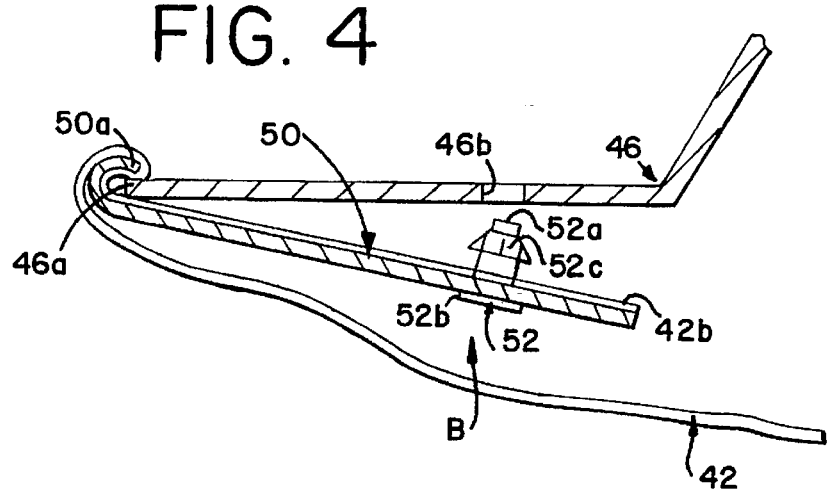
FIG. 4 is a view similar to FIG. 3 illustrating graphically the position of the tether and attachment bracket in hooked engagement with a free end of a fixedly mounted element in the motor vehicle.
Figure 5:
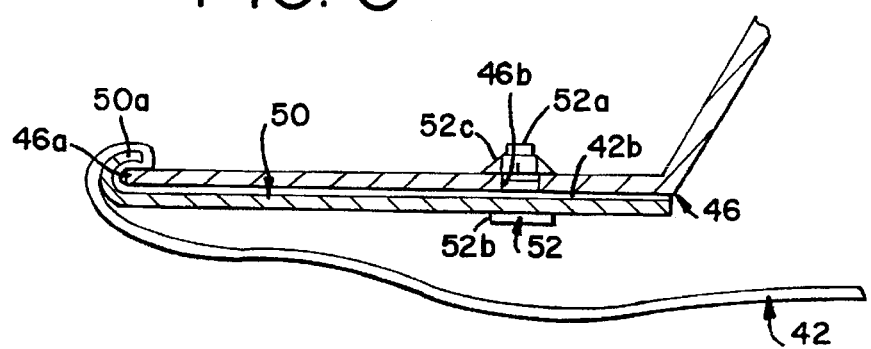
FIG. 5 is a view similar to FIG. 4 illustrating graphically the tether and attachment bracket in a fully secured position on the fixedly mounted element with a snap-in-type fastener locked in place.

Referring now more specifically to FIGS. 3, 4 and 5, in accordance with the features of the present invention, each tether 42 has an inner end portion 42b which is inserted inwardly through the panel opening 22 before the cover 40 is mounted in place to close the panel opening for protecting the air bag inflator module 24 until air bag deployment occurs.

One or more bracket elements 46 are mounted in fixed positions in the motor vehicle 10 and each has a base segment attached by spot welding 48 or other fastening means to an upper wall of the housing 26 (FIG. 1) of the air bag inflator module 24. Each bracket element 46 may also be fixedly attached to the back side of the dashboard panel 20 above the panel opening 22 as shown in FIG. 2. Each fixed bracket element 46 has a forwardly extending free outer end 46a having a width dimension that approximates the width of the tether 42. Spaced rearwardly of the free outer end 46a, the fixed bracket elements 46 are provided with an aperture 46b.

In accordance with the features of the present invention, one or more attachment brackets or connectors 50 each having a width about the same as that of the fixed bracket elements 46 are provided and each attachment bracket has a hook-shaped forward end 50a. A unidirectional, snap-in-type, headed fastener 52, is fixedly mounted on each attachment bracket 50 and is spaced at a distance from the hook end 50a so as to align with the aperture 46b of the associated fixed bracket element 46 when the hook end is moved into hooked engagement with the free end 46a of an associated fixed bracket element 46 (Arrow A—FIG. 34). The inner end portion 42b of each tether 42 is sandwiched between a fixed bracket element 46 and an attachment bracket 50 as shown in FIGS. 4 and 5.

Referring to FIG. 3, a bitter end portion of the inner end 42b of each tether web 42 is attached to an attachment bracket 50 by first piercing the web with a punch or drill to receive a shank portion 52a of a headed fastener 52 that is fixedly mounted on the attachment bracket. Thereafter, the inner end portion 42b of the tether web 42 is laid out toward the hook end 50a of the attachment bracket 50 and is looped around the hook end and brought back in a reverse direction along an opposite side or face of the attachment bracket as shown.

Each headed, unidirectional, self-locking-type fastener 52 includes an enlarged head 52b that is spot welded or otherwise secured to the underside of the attachment bracket 50 so that the fastener shank 52a will project upwardly through the body of the attachment bracket and the bitter end portion 42b of the associated tether 42 as best shown in FIGS. 3 and 4. The fastener shank 52a supports a compressible, generally frustoconically-shaped, segmented skirt 52c which is compressed inwardly by the surface of the aperture 46b in the fixed bracket element 46 as the the fastener shank 52a is moved upwardly as indicated by the Arrow B in FIG. 4. When the lower edges of the compressed fastener skirt 52c pass through the aperture 46b, the skirt then snaps back outwardly into a frustoconical configuration wherein the lower edges of the skirt engage the upper surface of fixed bracket element 46 locking the attachment bracket 50 and tether in place as shown in FIG. 5.

It should be noted that the final attachment of the tether 42 to the fixed bracket element 46 is rapid and easy requiring a relatively simple manipulation after the bitter end 42b of the tether is staked onto the shank 52a of the fastener 52. The manipulation involves engaging the hook end 50a of the attachment bracket 50 over the free end 46a of the fixed bracket element 46 (Arrow A—FIG. 3) followed by an upward thrust (Arrow B—FIG. 4) to snap the fastener 52 into the aperture 46b of the fixed bracket element 46 with the fastener skirt 52c expanded and edge locked against the upper surface of the fixed bracket element 46 as shown in FIG. 5.

Because the entire width of the tether 42 is supported against the free outer end 46a of the fixed bracket element 46 and is held firmly in place by the hook end 50a of the attachment bracket 50, there is no point type loading imposed on the tether along the length thereof so that high stress points are avoided. The tether 42 is secured with line type loading connections across the entire width of the tether web at both ends 42a and 42b connected to the cover 40 and fixed bracket element 46 respectively. The result is a fail-safe tether attachment system that is easy to install and requires no tools for installation.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for positively connecting an end portion of an air bag door tether formed of flexible material to a motor vehicle, comprising:

a fixed element fixedly mounted in a motor vehicle formed with a free end and a fastener receiving aperture spaced apart from said free end;

an attachment bracket having a hook at one end adapted to be hooked over the free end of said fixed element;

a tether formed of flexible material for restraining movement of an air bag door during air bag deployment having an end portion sandwiched between facing surfaces of said bracket and the fixed element; and a fastener on said bracket remote from said hook having a shank with compressible holding means thereon positioned to be compressed when passed through the aperture from one side of the fixed element and expandable after passage to engage an opposite side of the fixed element for retaining said hook in position hooked over the free end with said tether sandwiched between facing surfaces of said bracket and the fixed element.

2. The apparatus of claim 1, wherein:
said shank of said fastener extends generally normal to said surface of said bracket.

3. The apparatus of claim 2, wherein:
said attachment bracket is pivotally mounted on the fixed element while said hook is hooked over the free end thereof to move said fastener shank to pass into the aperture on the fixed element in a direction generally normal thereto.

4. The apparatus of claim 3, wherein:
said fastener has a head at one end of said shank secured adjacent an outwardly facing surface of said bracket.

5. The apparatus of claim 1, wherein:
the end portion of the tether is staked onto said fastener on said attachment bracket.

6. The apparatus of claim 5, wherein:
the end portion of the tether extends from the fastener along one side of said attachment bracket and around said hook at one end.

7. The apparatus of claim 1, wherein:
the tether comprises a web of substantial width and said one end of said attachment bracket has a width approximating the width of the tether.

8. The apparatus of claim 7, wherein:
the fixed element has a width at the free end approximating the width of the tether.

9. The apparatus of claim 1, wherein:
said fastener has a head secured to said attachment bracket and said shank extending toward the fixed element when said attachment bracket is hooked over the free end.

10. The apparatus of claim 9, wherein:
said fastener includes a compressible skirt mounted on said shank having edges expandable away from said shank to engage the opposite side of the fixed element after passage through the aperture therein.

11. In combination, an element fixedly mounted in a motor vehicle having a free end and an aperture spaced apart therefrom, a flexible tether for restraining an air bag cover having an end portion manually secured to said fixedly mounted element, a connector having a hook at one end engaged in hooked relation over said free end of said fixedly mounted element with said end portion of said tether sandwiched between facing adjacent surfaces of said connector and said fixedly mounted element, and a unidirectional, self-locking, fastener on said connector remote from said hook having a shank positioned to extend through said aperture when said connector is pivoted about said hook at one end relative to said element for locking said connector and tether in sandwiched relation with said element while said hook is in hooked relation with said free end of said element.

12. The combination of claim 11, wherein:
said tether comprises a web of substantial width and the free end of the fixedly mounted element has a width approximating that of said tether.

13. The combination of claim 12, wherein:
said connector has a width at said end approximating that of said tether.

14. The combination of claim 11, wherein:

said fastener is fixedly attached to said connector with said shank extending outwardly thereof toward the fixedly mounted element.

15. The combination of claim 14, wherein:

said tether is staked onto said shank of said fastener.

16. The combination of claim 15, wherein:

said tether extends from said shank of said fastener around said hook end of said connector and then in a reverse direction therefrom along an opposite side of said connector away from said shank of said fastener.

17. The combination of claim 16, wherein:

said tether extends around said free end of said fixedly mounted element.

18. The combination of claim 11, wherein:

said free end of said fixedly mounted element extends transversely across the width of said tether.

19. The combination of claim 18, wherein:

line contact is established between said tether and the free end of said fixedly mounted element extending transversely across the width of the tether.

20. The combination of claim 11, wherein:

said hook at one end of said connector extends transversely across the width of said tether.

* * * * *